(12) United States Patent
Awazu et al.

(10) Patent No.: US 11,440,799 B2
(45) Date of Patent: Sep. 13, 2022

(54) CARBON MATERIAL AND METHOD FOR MANUFACTURING CARBON MATERIAL

(71) Applicants: SUMITOMO ELECTRIC INDUSTRIES, LTD., Osaka (JP); KYOTO UNIVERSITY, Kyoto (JP)

(72) Inventors: Tomoyuki Awazu, Itami (JP); Masatoshi Majima, Itami (JP); Yoshiki Nishibayashi, Itami (JP); Toshiyuki Nohira, Kyoto (JP); Kouji Yasuda, Kyoto (JP); Kouji Hidaka, Kyoto (JP)

(73) Assignees: SUMITOMO ELECTRIC INDUSTRIES, LTD., Osaka (JP); KYOTO UNIVERSITY, Kyoto (JP)

(*) Notice: Subject to any disclaimer, the term of this patent is extended or adjusted under 35 U.S.C. 154(b) by 449 days.

(21) Appl. No.: 16/332,868

(22) PCT Filed: Nov. 21, 2017

(86) PCT No.: PCT/JP2017/041844
§ 371 (c)(1),
(2) Date: Mar. 13, 2019

(87) PCT Pub. No.: WO2018/097134
PCT Pub. Date: May 31, 2018

(65) Prior Publication Data
US 2019/0359487 A1    Nov. 28, 2019

(30) Foreign Application Priority Data

Nov. 22, 2016 (JP) .............. JP2016-227083
Mar. 15, 2017 (JP) .............. JP2017-050531

(51) Int. Cl.
*C01B 32/05* (2017.01)
*C25B 1/14* (2006.01)
*C25B 11/043* (2021.01)
*C25B 1/135* (2021.01)

(52) U.S. Cl.
CPC .............. *C01B 32/05* (2017.08); *C25B 1/135* (2021.01); *C25B 1/14* (2013.01); *C25B 11/043* (2021.01); *C01P 2002/82* (2013.01)

(58) Field of Classification Search
CPC .. C25B 1/00; C25B 1/01; C25B 1/135; C25B 9/09
See application file for complete search history.

(56) References Cited

U.S. PATENT DOCUMENTS

| | | | |
|---|---|---|---|
| 2005/0118939 A1* | 6/2005 | Duescher | B24D 11/00 451/527 |
| 2014/0202874 A1* | 7/2014 | Elgammal | C25B 15/08 205/555 |
| 2016/0016805 A1 | 1/2016 | Fray et al. | |

FOREIGN PATENT DOCUMENTS

| | | | | |
|---|---|---|---|---|
| CA | 2729091 A1 | * | 12/2009 | ........... C23C 28/042 |
| CN | 104389012 A | * | 3/2015 | |

(Continued)

OTHER PUBLICATIONS

Li et al, "A One-Pot Synthesis of Hydrogen and Carbon Fuels from Water and Carbon Dioxide," Adv. Energy Mater. 2015, 5, 1401791 (Year: 2015).*

(Continued)

*Primary Examiner* — Salil Jain
(74) *Attorney, Agent, or Firm* — Faegre Drinker Biddle & Reath LLP

(57) ABSTRACT

A carbon material has at least either a peak related to diamond bonds, or a peak related to diamond-like bonds, appearing in a range of 1250 to 1400 $cm^{-1}$ in a spectrum measured by Raman scattering spectrometry, and a full width at half maximum of a maximum peak, or each of full widths at half maximum of the maximum peak and a second largest peak, among peaks appearing in the range of 1250 to 1400 $cm^{-1}$, has a signal less than 100 $cm^{-1}$.

3 Claims, 4 Drawing Sheets

(56) References Cited

FOREIGN PATENT DOCUMENTS

| CN | 104562073 | A | * | 4/2015 |
|---|---|---|---|---|
| CN | 104562073 | A | | 4/2015 |
| JP | 2016-505490 | A | | 2/2016 |
| JP | 2016-89230 | A | | 5/2016 |
| JP | 2016089230 | A | * | 5/2016 |

OTHER PUBLICATIONS

Ito et al, "Electrochemical Formation of Thin Carbon Film from Molten Chloride System," 1992 Proceedings of the Electrochemical Society, vol. 1992-16 57 (Year: 1992).*

Lou et al., Synthesis of Large-Size Diamonds by Reduction of Dense Carbon Dioxide with Alkali Metals (K, Li), J. Phys. Chem. B 2004, 108, 4239-4241.*

Nohira, Toshiyuki, "Electrolytic synthesis of diamond in molten salts," 2013 Fiscal Year Final Research Results Report (Kakenhi-Project), Project/Area No. 24655192, Jun. 16, 2014, 4 pages.

CN Office Action dated Mar. 31, 2021 in Chinese Application No. 201780056604.X. (with attached English-language translation).

Zhengsong Lou et al., "Synthesis of diamond and carbon materials by chemical reduction of carbon dioxide", Beijing: Beijing University of Posts and Telecommunications Press, Dec. 31, 2013, pp. 39-48.

English-language translation of Zhengsong Lou et al., "Synthesis of diamond and carbon materials by chemical reduction of carbon dioxide", Beijing: Beijing University of Posts and Telecommunications Press, Dec. 31, 2013, pp. 39-48, previously submitted.

English-language translation of Nohira, Toshiyuki, "Electrolytic synthesis of diamond in molten salts," 2013 Fiscal Year Final Research Results Report (Kakenhi-Project), Project/Area No. 24655192, Jun. 16, 2014, 4 pages, previously submitted.

* cited by examiner

CARBON MATERIAL AND METHOD FOR MANUFACTURING CARBON MATERIAL

TECHNICAL FIELD

The present disclosure relates to a carbon material and a method for manufacturing a carbon material.

This application claims priority on Japanese Patent Application No. 2016-227083 filed on Nov. 22, 2016 and Japanese Patent Application No. 2017-050531 filed on Mar. 15, 2017, the entire contents of which are incorporated herein by reference.

BACKGROUND ART

As a method for manufacturing diamond, for example, Patent Literature 1 proposes a method in which, under a carbon dioxide atmosphere, electrolytic reduction of carbon dioxide is performed in a molten salt while a cathode voltage is controlled.

CITATION LIST

Patent Literature

PATENT LITERATURE 1: Japanese Laid-Open Patent Publication No. 2016-89230

SUMMARY OF INVENTION

One aspect of the present disclosure is directed to a carbon material having at least either a peak related to diamond bonds, or a peak related to diamond-like bonds, appearing in a range of 1250 to 1400 $cm^{-1}$ in a spectrum measured by Raman scattering spectrometry, wherein a full width at half maximum of a maximum peak, or each of full widths at half maximum of the maximum peak and a second largest peak, among peaks appearing in the range of 1250 to 1400 $cm^{-1}$, has a signal less than 100 $cm^{-1}$.

Another aspect of the present disclosure is directed to a method for manufacturing a carbon material, the method comprising the step of, in a state where an anode and a cathode having a roughened surface are disposed in a molten salt electrolytic solution containing carbonate ions and hydroxide ions in a molten salt, performing electrolytic reduction of the carbonate ions and the hydroxide ions contained in the molten salt electrolytic solution, to generate a carbon material on the cathode.

Still another aspect of the present disclosure is directed to a method for manufacturing a carbon material, the method comprising the step of, in a state where an anode and a cathode are disposed in a molten salt electrolytic solution containing carbonate ions and hydroxide ions in a molten salt, performing electrolytic reduction of the carbonate ions and the hydroxide ions under a condition that reaction in which $sp^2$ carbon atoms and adsorbed hydrogen atoms are reacted with each other to generate methane gas is promoted, to generate a carbon material on the cathode.

DESCRIPTION OF EMBODIMENTS

Technical Problem

Figure 1:
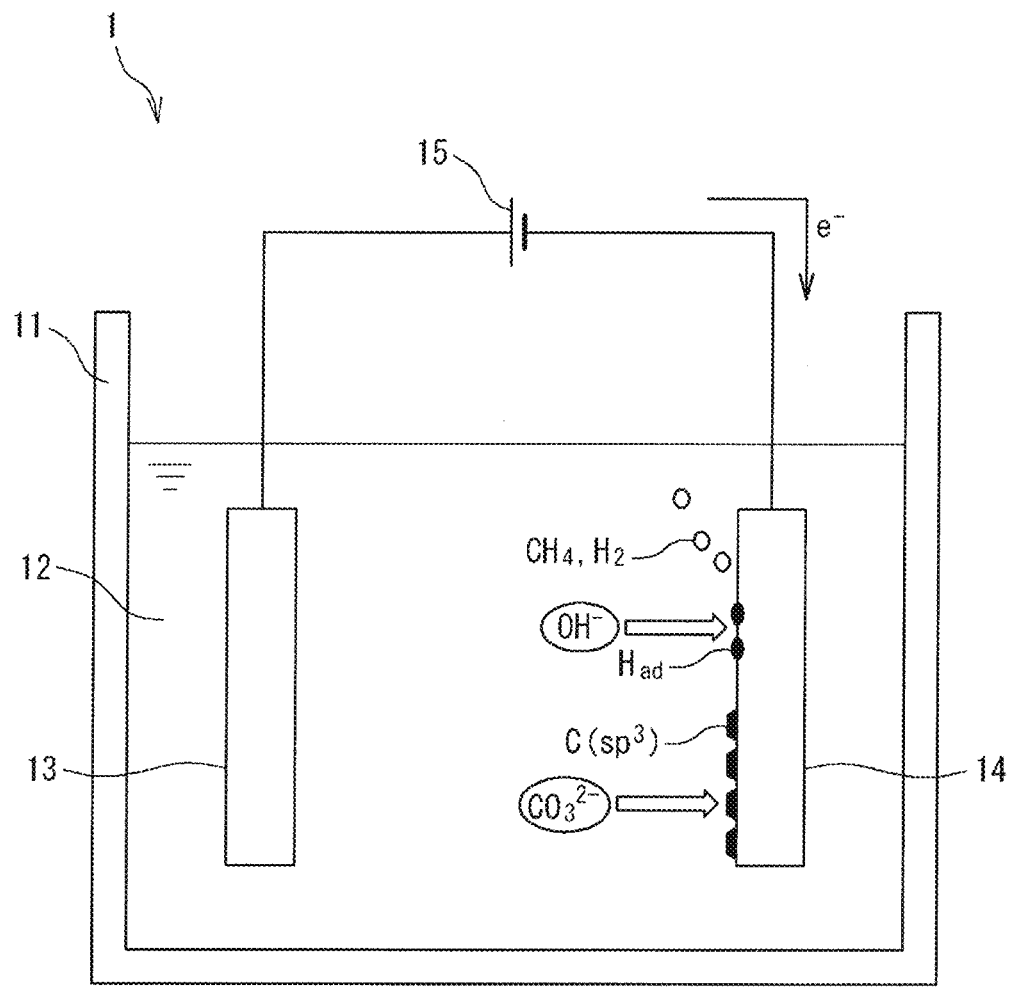
FIG. 1 is a diagram schematically illustrating the principle of methods for manufacturing a carbon material.

When electrolytic reduction of carbon dioxide is performed, $sp^2$ carbon atoms are more likely to be generated than $sp^3$ carbon atoms, which can form a diamond structure. Thus, the method described in Patent Literature 1 has a drawback that it is difficult to form a diamond structure. The term "$sp^2$ carbon atom" refers to a carbon atom forming $sp^2$ hybrid orbitals in bonding between carbon atoms. In addition, the term "$sp^3$ carbon atom" refers to a carbon atom forming $sp^3$ hybrid orbitals in bonding between carbon atoms.

The present disclosure has been made in view of such circumstances, and an object of the present disclosure is to provide a novel method for manufacturing a carbon material, by which a carbon material containing diamond can be manufactured at normal pressure and which is different from electrolytic reduction of carbon dioxide, and a novel carbon material manufactured by the manufacturing method.

Advantageous Effects of Invention

According to the present disclosure, a carbon material can be manufactured at normal pressure without performing electrolytic reduction of carbon dioxide. In addition, a novel carbon material can be provided.

SUMMARY OF EMBODIMENTS OF INVENTION

First, contents of embodiments of the present invention will be listed and described.

(1) A carbon material according to an embodiment of the present disclosure has at least either a peak related to diamond bonds, or a peak related to diamond-like bonds, appearing in a range of 1250 to 1400 $cm^{-1}$ in a spectrum measured by Raman scattering spectrometry, and a full width at half maximum of a maximum peak, or each of full widths at half maximum of the maximum peak and a second largest peak, among peaks appearing in the range of 1250 to 1400 $cm^{-1}$, has a signal less than 100 $cm^{-1}$.

The carbon material according to the present embodiment is a novel carbon material having a specific spectrum in a spectrum measured by Raman scattering spectrometry.

The peak related to "diamond bonds" is a peak having a maximum value in the range of not less than 1325 $cm^{-1}$ and less than 1335 $cm^{-1}$. In addition, the peak related to "diamond-like bonds" is a peak having a maximum value in the range of not less than 1335 $cm^{-1}$ and less than 1400 $cm^{-1}$.

The carbon material according to the embodiment of the present disclosure contains one or more of diamond, DLC (Diamond-Like Carbon), and glassy carbon (including amorphous carbon).

Such a carbon material is suitable, for example, as raw materials for tools and raw materials for abrasion resistance.

(2) Preferably, the carbon material has the peak related to diamond-like bonds in the spectrum, and the peak related to diamond-like bonds includes at least one peak in a range of not less than 1335 cm$^{-1}$ and not greater than 1370 cm$^{-1}$.

The surface of such a carbon material is flat, and cracking and chipping are reduced therein, so that the carbon material is more suitable as raw materials for tools and raw materials for abrasion resistance.

(3) Preferably, the carbon material has the peak related to diamond bonds in the spectrum, the peak related to diamond bonds is in the range of not less than 1325 cm$^{-1}$ and less than 1335 cm$^{-1}$ and has a full width at half maximum less than 20 cm$^{-1}$, and an area that does not contain a part of a crystal that is a hexa-octahedron is present in a portion having a signal of the peak related to diamond bonds.

Such a carbon material has high surface hardness, cracking and chipping are reduced therein, and the surface of the carbon material becomes flat. Thus, the carbon material is further suitable as raw materials for tools and raw materials for abrasion resistance.

(4) Preferably, the carbon material is a carbon material formed on a substrate, and the peak related to diamond bonds or the peak related to diamond-like bonds is contained in an area that is equal to or greater than 10% of an entire main surface of the substrate.

This is because, in this case, when the carbon material is used for a tool for abrasion resistance or the like, the carbon material is present on the main surface of the substrate as a carbon material in a state where the carbon material can resist a compression load from an opposite material and desired abrasion resistance can be achieved.

(5) Preferably, the carbon material has a peak related to graphite bonds or a peak related to graphite-like bonds in a range of 1500 to 1650 cm$^{-1}$, and the peak related to diamond bonds or the peak related to diamond-like bonds has a signal greater than 0.15 in peak ratio as compared to the peak related to graphite bonds or the peak related to graphite-like bonds appearing in the range of 1500 to 1650 cm$^{-1}$.

In this case, a sufficient hardness suitable for raw materials for tools and raw materials for abrasion resistance can be ensured.

(6) The carbon material preferably contains an alkali metal element.

This is because, when an alkali metal is contained in a carbon material having a small lattice interval, carbon bonds are partially cut, and thus the carbon material becomes a material that is less likely to induce cracking or fracture.

(7) The carbon material also preferably contains a halogen element.

This is because, in this case, when the halogen element is present in a portion where carbon at which bonds are partially cut is present and it bonds to the carbon, the carbon is stabilized, and a material that is less likely to cause progress of cracking or fracture is obtained.

(8) A method for manufacturing a carbon material according to an embodiment of the present disclosure includes the step of, in a state where an anode and a cathode having a roughened surface are disposed in a molten salt electrolytic solution containing carbonate ions and hydroxide ions in a molten salt, performing electrolytic reduction of the carbonate ions and the hydroxide ions contained in the molten salt electrolytic solution, to generate a carbon material on the cathode.

In the method according to the present embodiment, in a state where the anode and the cathode are disposed in the molten salt electrolytic solution containing carbonate ions and hydroxide ions in a molten salt, electrolytic reduction of the carbonate ions and the hydroxide ions is performed. Thus, sp$^2$ carbon atoms and sp$^3$ carbon atoms derived from the carbonate ions and adsorbed hydrogen atoms derived from the hydroxide ions can be generated. The sp$^2$ carbon atoms more easily react with the adsorbed hydrogen atoms than the sp$^3$ carbon atoms. Therefore, the sp$^2$ carbon atom can be removed from the molten salt electrolytic solution as methane gas, which is a reaction product with the adsorbed hydrogen atoms. In addition, oxide ions generated as a result of reduction of the carbonate ions and the hydroxide ions remain in the molten salt electrolytic solution, but are oxidized at the anode and can be removed from the molten salt electrolytic solution as oxygen gas. Accordingly, the existence ratio of the sp$^3$ carbon atom on the cathode can be increased. In addition, in the method according to this embodiment, since the cathode having the roughened surface is used in the electrolytic reduction, a carbon material formed from the sp$^3$ carbon atoms can be efficiently deposited on the cathode. Therefore, with the method according to this embodiment, a carbon material having more sp$^3$ bonds than in the case without using hydroxide ions under normal pressure can be manufactured even without performing electrolytic reduction of carbon dioxide.

(9) The cathode having the roughened surface is preferably a cathode having a surface roughened by diamond abrasive grains. In the case of using such a cathode, the proportion of spa bonds in a deposited carbon material is higher.

(10) The molten salt is preferably a molten salt containing at least one type of cation selected from the group consisting of alkali metal ions and alkaline earth metal ions, as a cation, and a halide anion as an anion. This is because, in the molten salt, the carbonate ions and the hydroxide ions can be stably present, and electrolytic reduction of the carbonate ions and the hydroxide ions can be efficiently performed. In addition, the molten salt is dissolved at a relatively low temperature, and is stable even after being melted.

(11) A hydroxide ion concentration of the molten salt electrolytic solution is preferably not less than 2 mol %. This is because the amount of adsorbed hydrogen atoms to be generated by electrolytic reduction is increased and the sp$^2$ carbon atoms can be more assuredly removed as methane gas from the molten salt electrolytic solution.

(12) A method for manufacturing a carbon material according to another embodiment of the present disclosure includes the step of, in a state where an anode and a cathode are disposed in a molten salt electrolytic solution containing carbonate ions and hydroxide ions in a molten salt, performing electrolytic reduction of the carbonate ions and the hydroxide ions under a condition that reaction in which sp$^2$ carbon atoms and adsorbed hydrogen atoms are reacted with each other to generate methane gas is promoted, to generate a carbon material on the cathode.

In the method according to the present embodiment, in the molten salt electrolytic solution containing carbonate ions and hydroxide ions in a molten salt, electrolytic reduction of the carbonate ions and the hydroxide ions is performed under a condition that reaction in which sp$^2$ carbon atoms and adsorbed hydrogen atoms are reacted with each other to generate methane gas is promoted. Thus, the sp$^2$ carbon atoms can be more efficiently removed from the molten salt electrolytic solution, as methane gas that is a reaction product with the adsorbed hydrogen atoms. Accordingly, the existence ratio of the $sp^3$ carbon atoms on the cathode is increased, and thus a carbon material having more $sp^3$ bonds can be obtained on the cathode. Therefore, with the method according to this embodiment, a carbon material having more $sp^3$ bonds than in the case without using hydroxide ions under normal pressure can be manufactured even without performing electrolytic reduction of carbon dioxide.

(13) The molten salt is preferably a molten salt containing at least one type of cation selected from the group consisting of alkali metal ions and alkaline earth metal ions, as a cation, and a halide anion as an anion. In this case, the proportion of $sp^3$ bonds in a deposited carbon material is higher.

(14) A hydroxide ion concentration of the molten salt electrolytic solution is preferably not less than 2 mol %. This is because, similar to the above (11), the amount of adsorbed hydrogen atoms to be generated by electrolytic reduction is increased and the $sp^2$ carbon atoms can be more assuredly removed as methane gas from the molten salt electrolytic solution.

DETAILS OF EMBODIMENTS OF INVENTION

Specific examples of embodiments of the present disclosure will be described with reference to the drawings as appropriate. The present disclosure is not limited to these examples but is indicated by the appended claims, and is intended to include meaning equivalent to the claims and all modifications within the scope of the claims.

A method for manufacturing a carbon material according to an embodiment of the present disclosure includes a step of, in a state where an anode and a cathode having a roughened surface are disposed in a molten salt electrolytic solution containing carbonate ions and hydroxide ions in a molten salt, performing electrolytic reduction of the carbonate ions and the hydroxide ions contained in the molten salt electrolytic solution, to generate a carbon material on the cathode (hereinafter, also referred to as a "method of Embodiment 1").

A method for manufacturing a carbon material according to another embodiment of the present disclosure includes a step of, in a state where an anode and a cathode are disposed in a molten salt electrolytic solution containing carbonate ions and hydroxide ions in a molten salt, performing electrolytic reduction of the carbonate ions and the hydroxide ions under a condition that reaction in which $sp^2$ carbon atoms and adsorbed hydrogen atoms are reacted with each other to generate methane gas is promoted, to generate a carbon material on the cathode (hereinafter, also referred to as a "method of Embodiment 2").

A carbon material according to an embodiment of the present disclosure is a carbon material that can be manufactured by the method of Embodiment 1 or the method of Embodiment 2, the carbon material having at least either a peak related to diamond bonds, or a peak related to diamond-like bonds, appearing in the range of 1250 to 1400 $cm^{-1}$ in a spectrum measured by Raman scattering spectrometry, wherein a full width at half maximum of the maximum peak, or each of full widths at half maximum of the maximum peak and the second largest peak, among peaks appearing in the range of 1250 to 1400 $cm^{-1}$, has a signal less than 100 $cm^{-1}$ (hereinafter, also referred to as a "carbon material of Embodiment 3").

The principle of the methods of Embodiments 1 and 2 will be described with reference to FIG. 1. In FIG. 1, an electrolytic reduction apparatus 1 includes an electrolytic bath 11, a molten salt electrolytic solution 12, an anode 13, a cathode 14, and a power supply 15. The molten salt electrolytic solution 12 is stored in the electrolytic bath 11. The molten salt electrolytic solution 12 is an electrolytic solution containing carbonate ions and hydroxide ions in a molten salt. The anode 13 and the cathode 14 are each disposed in the electrolytic bath 11 so as to be immersed in the molten salt electrolytic solution 12. The electrolytic reduction apparatus 1 may further include a heater and a thermocouple that are not shown, etc.

In the electrolytic reduction apparatus 1, when electricity is applied between the anode 13 and the cathode 14, the carbonate ions ("$CO_3^{2-}$" in the drawing) and the hydroxide ions ("$OH^-$" in the drawing) in the molten salt electrolytic solution 12 receive electrons ("$e^-$" in the drawing) from the cathode 14. At this time, carbon deposition, hydrogen gas generation, and methane gas generation progress on the cathode 14.

Reaction during carbon deposition is represented by formula (I):

$$CO_3^{2-}+4e^-\rightarrow C(sp^2+sp^3)+3O^{2-} \quad (I)$$

(wherein "C($sp^2$+$sp^3$)" represents a mixture of $sp^2$ carbon atoms and $sp^3$ carbon atoms).

In the reaction represented by formula (I), the carbonate ions are reduced, whereby $sp^2$ carbon atoms, $sp^3$ carbon atoms, and oxide ions are generated. Among them, the $sp^2$ carbon atoms are used in reaction of methane gas generation. Meanwhile, the $sp^3$ carbon atoms form a diamond structure on the cathode 14. Accordingly, diamond ("C($sp^3$)" in the drawing) is deposited on the cathode 14.

Reaction during hydrogen gas generation is represented by formulas (II) to (IV):

$$OH^-+e^-\rightarrow H_{ad}+O^{2-} \quad (II)$$

$$H_{ad}+H_{ad}\rightarrow H_2 \quad (III)$$

$$H_{ad}+OH^-+e^-\rightarrow H_2+O^- \quad (IV)$$

(wherein "$H_{ad}$" represents an adsorbed hydrogen atom). In the reaction represented by formula (II), the hydroxide ions are reduced, whereby adsorbed hydrogen atoms ("$H_{ad}$" in the drawing) and oxide ions (not shown) are generated on the cathode 14. The adsorbed hydrogen atoms are used in the reaction represented by formula (III), the reaction represented by formula (IV), and reaction for methane gas generation. By the reaction represented by formula (III) and formula (IV), hydrogen gas is generated. The generated hydrogen gas is discharged out of the molten salt electrolytic solution 12.

The reaction for methane gas generation is represented by formula (V):

$$C(sp^2)+4H_{ad}\rightarrow CH_4 \quad (V).$$

In the reaction represented by formula (V), methane gas is generated by reaction between the $sp^2$ carbon atoms generated by the reaction represented by formula (I) and the adsorbed hydrogen atoms generated by the reaction represented by formula (II). The generated methane gas is discharged out of the molten salt electrolytic solution 12. Accordingly, the $sp^2$ carbon atoms generated by the reaction represented by formula (I) are removed from the molten salt electrolytic solution 12, and the existence ratio of $sp^3$ carbon atoms near the cathode increases. Only the $sp^3$ carbon atoms form a diamond structure on the cathode 14.

As described above, in the methods of Embodiments 1 and 2, the following (1) and (2) are simultaneously performed by causing carbonate ions and hydroxide ions to coexist in a molten salt and performing electrolytic reduction of the carbonate ions and the hydroxide ions.

(1) Cause reaction between $sp^2$ carbon atoms derived from the carbonate ions and adsorbed hydrogen atoms derived from the hydroxide ions and remove the $sp^2$ carbon atoms as methane gas.

(2) Form a carbon material containing diamond.

Next, conditions, etc., that are common to the methods of Embodiments 1 and 2 will be described. In the methods of Embodiments 1 and 2, the interior of the electrolytic bath is made into an inert gas atmosphere, then a cathode and an anode are placed therein, a molten salt electrolytic solution is put into the electrolytic bath, and electrolytic reduction is performed, whereby the carbon material according to the embodiment of the present disclosure can be manufactured.

Examples of an inert gas used in the inert gas atmosphere include argon gas, but the inert gas is not particularly limited.

Examples of the material that forms the cathode include nickel, titanium, and silicon carbide, but the material is not particularly limited. Examples of the shape of the cathode include a plate shape, but the shape is not particularly limited. The surface area of the cathode can be set as appropriate in accordance with a desired deposition amount of the carbon material, or the like.

Examples of the anode include a glassy carbon electrode, a graphite electrode, a boron-doped diamond electrode, a platinum electrode, an iridium electrode, a ferrite-based oxygen generating electrode, and a tin oxide-based oxygen generating electrode, but the anode is not particularly limited. The shape of the anode is not particularly limited.

The molten salt electrolytic solution can be obtained, for example, by mixing a carbonate and a hydroxide salt into a molten salt.

The molten salt used in the molten salt electrolytic solution preferably has a melting point of 250 to 800° C. from the viewpoint of efficiently removing $sp^2$ carbon atoms and leaving only spa carbon atoms. Examples of the molten salt include a molten salt containing at least one type of cation selected from the group consisting of alkali metal ions and alkaline earth metal ions, as a cation, and a halide anion as an anion (hereinafter, also referred to as a "molten salt A"); and LiCl—KCl, LiCl—KCl—CsCl, LiF—NaF—KF, KF—KCl, $CaCl_2$—$BaCl_2$, LiCl—$CaCl_2$, NaCl—$CaCl_2$, KCl—$CaCl_2$, and $CaCl_2$). However, the molten salt is not particularly limited. Among these molten salts, the molten salt A is preferable from the viewpoint of more efficiently depositing the carbon material according to the embodiment of the present disclosure.

The cation in the molten salt A is at least one type selected from the group consisting of alkali metal ions and alkaline earth metal ions. The cation may be any of (i) a combination of a plurality of types of alkali metal ions, (ii) a combination of a plurality of types of alkaline earth meal ions, and (iii) a combination of at least one type of alkali metal ion and at least one type of alkaline earth metal ion. Examples of the alkali metal ions include lithium ion, sodium ion, and potassium ion. In addition, examples of the alkaline earth metal ions include magnesium ion, calcium ion, strontium ion, and barium ion.

The anion in the molten salt A is halide ion. The anion may be one type of halide ion or may be a plurality of types of halide ions. Examples of the halide ions include fluoride ion, chloride ion, bromide ion, and iodide ion.

Specific examples of the molten salt A include (a) a mixed molten salt containing a plurality of types of alkali metal halides (hereinafter, also referred to as a "mixed molten salt a"), (b) a mixed molten salt containing a plurality of types of alkaline earth metals (hereinafter, also referred to as a "mixed molten salt b"), and (c) a mixed molten salt containing at least one type of alkali metal halide and at least one type of alkaline earth metal halide (hereinafter, also referred to as a "mixed molten salt c"). Examples of the alkali metal halides include lithium chloride, sodium chloride, and potassium chloride, but the alkali metal halides are not particularly limited. Examples of the alkaline earth metal halides include calcium chloride, strontium chloride, and barium chloride, but the alkaline earth metal halides are not particularly limited. Examples of the mixed molten salt a include a mixed molten salt of lithium chloride and potassium chloride, LiCl:KCl=20:80 to 80:20 (mole ratio), and preferably a eutectic composition molten salt LiCl:KCl=58.5:41.5 (mole ratio), but the mixed molten salt a is not particularly limited. Examples of the mixed molten salt b include a mixed molten salt of calcium chloride and barium chloride, $CaCl_2$:$BaCl_2$=20:80 to 80:20 (mole ratio), and preferably a eutectic composition molten salt $CaCl_2$:$BaCl_2$=65:35 (mole ratio), but the mixed molten salt b is not particularly limited. Examples of the mixed molten salt c include a mixed molten salt of lithium chloride and calcium chloride, LiCl:$CaCl_2$=20:80 to 80:20 (mole ratio), and preferably a eutectic composition molten salt LiCl:$CaCl_2$=61:39 (mole ratio), but the mixed molten salt c is not particularly limited. Among these molten salts A, the eutectic composition molten salt of lithium chloride and potassium chloride is preferable from the viewpoint of more efficiently depositing the carbon material according to the embodiment of the present disclosure.

Examples of the carbonate include alkali metal carbonates such as sodium carbonate and potassium carbonate; and alkaline earth metal carbonates such as calcium carbonate, but the carbonate is not particularly limited. The carbonate is preferably alkali metal carbonates and alkaline earth metal carbonates, and more preferably potassium carbonate, due to ready availability.

Examples of the hydroxide salt include alkali metal hydroxide salts such as sodium hydroxide and potassium hydroxide; and alkaline earth metal hydroxide salts such as calcium hydroxide, but the hydroxide salt is not particularly limited. The hydroxide salt is preferably alkali metal hydroxide salts and alkaline earth metal hydroxide salts, and more preferably potassium hydroxide, due to ready availability.

The hydroxide ion concentration of the molten salt electrolytic solution is preferably not less than 2 mol % from the viewpoint of promoting the reaction for methane gas generation to reduce the amount of a deposit derived from $sp^2$ carbon atoms in electrolytic reduction and improving the yield of the carbon material according to the embodiment of the present disclosure.

The carbonate ion concentration of the molten salt electrolytic solution is preferably lower than the above hydroxide ion concentration from the viewpoint of promoting the reaction for methane gas generation to reduce the amount of a deposit derived from $sp^2$ carbon atoms in electrolytic reduction and improving the yield of the carbon material according to the embodiment of the present disclosure. Therefore, the carbonate ion concentration of the molten salt electrolytic solution can be set as appropriate in accordance with the hydroxide ion concentration.

Presence/absence of generation of diamond can be confirmed, for example, by presence of a peak at approximately 1333 cm$^{-1}$ by Raman spectrometry, or presence of a crystal of diamond through an X-ray diffraction method or a scanning electron microscope. Normally, a sharp peak, having a full width at half maximum of 2 to 10 cm$^{-1}$ and arising from spa hybrid orbitals of diamond, being observed at approximately 1333 cm$^{-1}$ in a Raman spectrum can be an index for generation of diamond.

Next, the method of Embodiment 1 will be described. In the method of Embodiment 1, a cathode having a roughened surface is used as the cathode. The cathode having the roughened surface is obtained, for example, by roughening the surface of a material used for the cathode with abrasive grains. Examples of the abrasive grains include diamond abrasive grains and silicon carbide abrasive grains, but the abrasive grains are not particularly limited. Among these abrasive grains, diamond abrasive grains are preferable from the viewpoint of more efficiently generating the carbon material according to the embodiment of the present disclosure. As the diamond abrasive grains, for example, trade name: MD500 manufactured by Tomei Diamond Co., Ltd. (central grain diameter ($D_{50}$): 480 to 529 nm), etc., can be used.

The grain diameters of the abrasive grains are preferably not less than 20 nm and more preferably not less than 50 nm, from the viewpoint of obtaining a rough surface sufficient to promote deposition of the carbon material on the cathode. In addition, the grain diameters of the abrasive grains are preferably not greater than 5 μm and more preferably not greater than 2 from the viewpoint of obtaining a rough surface sufficient to promote deposition of the carbon material on the cathode. The surface roughness of the cathode can be set as appropriate in accordance with the grain diameters of abrasive grains to be used.

In the method of Embodiment 1, the temperature of the molten salt electrolytic solution in performing electrolytic reduction is preferably not lower than 650° C. from the viewpoint of promoting the reaction for methane gas generation to reduce the amount of a deposit derived from sp$^2$ carbon atoms in electrolytic reduction and improving the yield of the carbon material according to the embodiment of the present disclosure. The upper limit of the temperature of the molten salt electrolytic solution in performing electrolytic reduction can be set as appropriate, within a range where volatilization of the liquid component of the molten salt electrolytic solution can be inhibited, in accordance with the type of molten salt to be used.

In the case of increasing the amount of the carbon material to be generated, the cathode potential in performing electrolytic reduction is preferably not greater than 1.2 V, more preferably not greater than 1.1 V, and further preferably not greater than 1.0 V. In addition, in this case, the cathode potential in performing electrolytic reduction is preferably not less than 0.5 V from the viewpoint of improving the yield of the carbon material. The potential is a potential represented with, as a reference, the potential of an alkali metal deposited at a cathode limit of the molten salt electrolytic solution.

In the method of Embodiment 1, electrolytic reduction may be performed such that the current density in reduction of the hydroxide ions is higher than the current density in reduction of the carbonate ions. Accordingly, it is possible to promote the reaction for methane gas generation to reduce the amount of a deposit derived from sp$^2$ carbon atoms.

Next, the method of Embodiment 2 will be described. The method of Embodiment 2 can be carried out under the same conditions, etc., as in the method of Embodiment 1, except that electrolytic reduction of the carbonate ions and the hydroxide ions is performed under a condition that the reaction in which sp$^2$ carbon atoms and adsorbed hydrogen atoms are reacted with each other to generate methane gas is promoted. In the method according to Embodiment 2, in the molten salt electrolytic solution, electrolytic reduction of the carbonate ions and the hydroxide ions is performed under a condition that the reaction in which sp$^2$ carbon atoms and adsorbed hydrogen atoms are reacted with each other to generate methane gas is promoted. Accordingly, the sp$^2$ carbon atoms can be efficiently removed as methane gas, which is a reaction product with the adsorbed hydrogen atoms, from the molten salt electrolytic solution. Due to the removal of the sp$^2$ carbon atoms, the existence ratio of spa carbon atoms on the cathode increases, and thus the carbon material can be generated in a larger amount on the cathode. In the method of Embodiment 2, the cathode that is used in Embodiment 1 may be used as the cathode, or a cathode, the surface of which has not been subjected to a roughening treatment, may be used as the cathode.

Examples of the condition that the reaction in which sp$^2$ carbon atoms and adsorbed hydrogen atoms are reacted with each other to generate methane gas is promoted, include: performing electrolytic reduction using a molten salt electrolytic solution, the temperature of which exceeds 650° C.; and performing electrolytic reduction such that the current density in reduction of the hydroxide ions is higher than the current density in reduction of the carbonate ions. However, the condition is not particularly limited.

The carbon material according to the embodiment of the present disclosure obtained as described above is useful, for example, as industrial raw materials, and this carbon material can be used as raw materials for tools, raw materials for abrasion resistance, etc.

The carbon material of Embodiment 3, which can be manufactured by the method of Embodiment 1 or the method of Embodiment 2, has at least either a peak related to diamond bonds, or a peak related to diamond-like bonds, appearing in the range of 1250 to 1400 cm$^{-1}$ in a spectrum measured by Raman scattering spectrometry (hereinafter, also referred to as a Raman spectrum), and the full width at half maximum of the maximum peak, or each of the full widths at half maximum of the maximum peak and the second largest peak, among peaks appearing in the range of 1250 to 1400 cm$^{-1}$ has a signal less than 100 cm$^{-1}$.

The Raman spectrum is a spectrum measured using an apparatus manufactured by Tokyo Instruments, Inc. (excitation light:He—Ne laser) with wave number resolution: 1.8 cm$^{-1}$ and wave number reproducibility of Raman scattering peaks: 0.5 cm$^{-1}$ or less.

At this time, a Raman shift value (peak value) is calibrated to a value obtained when a peak of a Raman spectrum of high pressure synthesis IIa type crystal diamond is set at 1331 cm$^{-1}$.

The carbon material of Embodiment 3 is characterized by having at least one peak in the range of 1250 to 1400 cm$^{-1}$ (a range related to diamond bonds and/or diamond-like bonds: D band) and in that the full width at half maximum of the maximum peak in this range is less than 100 cm$^{-1}$. It is preferred if the position of the peak is in this range, since the carbon material is hard. It is preferred if the full width at half maximum is in this range, since the hard carbon material becomes harder.

The position of the peak is preferably in the range of 1320 to 1380 $cm^{-1}$ and more preferably in the range of 1325 to 1365 $cm^{-1}$, from the viewpoint of enhancing the hardness of the carbon material.

The full width at half maximum is preferably less than 60 $cm^{-1}$, more preferably less than 40 $cm^{-1}$, further preferably less than 30 $cm^{-1}$, and particularly preferably less than 20 $cm^{-1}$. The carbon material becomes harder and is less worn when the full width at half maximum is smaller, and thus such a carbon material is suitable as raw materials for tools and raw materials for abrasion resistance.

In the carbon material of Embodiment 3, the position of the peak of the maximum peak is particularly preferably in the range of not less than 1335 $cm^{-1}$ and not greater than 1370 $cm^{-1}$. In this case, the surface of the carbon material becomes flat and has less cracking or chipping, and thus becomes more preferable as raw materials for tools and raw materials for abrasion resistance.

In addition to the peak position being in the range of not less than 1335 $cm^{-1}$ and not greater than 1370 $cm^{-1}$, it is similarly preferred to also have a peak in the range of not less than 1325 $cm^{-1}$ and less than 1335 $cm^{-1}$ and have peaks at a plurality of positions. In this case, the carbon material behaves like a complex material, and thus is less likely to be chipped off and becomes hard.

In the carbon material of Embodiment 3, particularly preferably, the position of a peak is in the range of not less than 1325 $cm^{-1}$ and less than 1335 $cm^{-1}$ and the full width at half maximum of the peak has a value less than 20 $cm^{-1}$, and the area of a carbon material in which such a peak appears (a spatial range having the peak in the range of not less than 1325 $cm^{-1}$ and less than 1335 $cm^{-1}$) does not contain a part of a crystal that is a hexa-octahedron (a quadrangular, triangular, or hexagonal flat surface included in the hexa-octahedron). At this time, the peak in the range of not less than 1325 $cm^{-1}$ and less than 1335 $cm^{-1}$ is more preferably the maximum peak. In this case, the carbon material has high surface hardness, and the surface of the carbon material becomes flat.

Regarding the lower limit of the full width at half maximum of the peak in the range of not less than 1325 $cm^{-1}$ and less than 1335 $cm^{-1}$, the full width at half maximum of the peak is preferably not less than 3 $cm^{-1}$, more preferably not less than 5 $cm^{-1}$, and further preferably not less than 6 $cm^{-1}$. When the full width at half maximum of the peak is not less than 3 $cm^{-1}$, the toughness becomes high; when the full width at half maximum of the peak is not less than 5 $cm^{-1}$, the toughness becomes higher; and when the full width at half maximum of the peak is not less than 6 $cm^{-1}$, the toughness becomes even higher.

Meanwhile, regarding the upper limit of the full width at half maximum of the peak, the full width at half maximum of the peak is preferably less than 20 $cm^{-1}$, more preferably less than 12 $cm^{-1}$, and further preferably less than 10 $cm^{-1}$. When the full width at half maximum of the peak is less than 20 $cm^{-1}$, the hardness becomes high; when the full width at half maximum of the peak is less than 12 $cm^{-1}$, the hardness becomes higher; and when the full width at half maximum of the peak is less than 10 $cm^{-1}$, the hardness becomes even higher.

When a carbon material having a peak in the range of not less than 1325 $cm^{-1}$ and less than 1335 $cm^{-1}$ does not contain a part of a crystal that is a hexa-octahedron (this mode also includes a mode in which the entirety of the crystal that is the hexa-octahedron is not contained), cracking and chipping are reduced in the carbon material. Thus, the carbon material is suitable as raw materials for tools and raw materials for abrasion resistance.

Regarding a conventional crystalline diamond having a peak in the range of not less than 1325 $cm^{-1}$ and less than 1335 $cm^{-1}$, when grains thereof are caused to grow on a substrate, the diamond normally contains a part of a crystal that is a hexa-octahedron, and the diamond in this state covers the entire surface of the substrate. However, the diamond in this state is not necessarily suitable for tools, and grain boundaries that are clearly present may cause cracking.

Meanwhile, when the carbon material of Embodiment 3 has a peak in the range of not less than 1325 $cm^{-1}$ and less than 1335 $cm^{-1}$ and the area of the carbon material having such a peak does not contain a part of a crystal that is a hexa-octahedron, the carbon material maintains hardness required for tools, and is less likely to be cracked or chipped off. Thus, the carbon material is suitable as raw materials for tools.

In the carbon material of Embodiment 3, the peak position and the full width at half maximum are a peak value and a full width at half maximum that are obtained by curve fitting with least squares in a Lorentz distribution on the assumption that a substantially straight background from 1000 $cm^{-1}$ to 1800 $cm^{-1}$ is subtracted and at least one peak is present in the range of 1250 to 1400 $cm^{-1}$.

More preferably, the values are values obtained by curve fitting on the assumption that a peak is further present in the range of 1500 to 1650 $cm^{-1}$. Further preferably, the values are values obtained by curve fitting on the assumption that two peaks are present in the range of 1300 to 1400 $cm^{-1}$ and two peaks are present in the range of 1500 to 1650 $cm^{-1}$. More peaks may be assumed. However, when the number of peaks is not less than four, the peak position and the full width at half maximum are not greatly changed even if the number of assumed peaks in curve fitting is different.

The carbon material of Embodiment 3 may have a film shape formed on a surface of a substrate. The carbon material is suitable to be manufactured as a film that is in close contact with a substrate. Here, as the substrate, for example, the cathode that is used in the methods of Embodiments 1 and 2 can be used. Such a film-shaped carbon material is suitable as raw materials for tools, raw materials for abrasion resistance, and raw materials for tools for abrasion resistance.

When the carbon material is a film formed on a substrate, the film thickness thereof is not particularly limited, but is preferably 0.01 μm to 1 mm. From the viewpoint of easy application to various uses, the film thickness is more preferably 0.1 μm to 50 μm.

In addition, the shape of the substrate (the shape of the surface thereof) does not necessarily need to be flat, and may be curved. Even when the substrate surface is curved, the flatness of the film surface formed by the carbon material after the point that the substrate surface is curved is subtracted is also good.

When the carbon material is a film formed on a substrate, the size of the area that satisfies the above Raman spectrum is preferably not less than 10% of the size of a main surface of the substrate.

This is because, in this case, when the carbon material is used for a tool for abrasion resistance or the like, the carbon material is present on the main surface of the substrate as a carbon material in a state where the carbon material can resist a compression load from an opposite material and desired abrasion resistance can be achieved.

The size of the area is more preferably not less than 20% of the size of the main surface of the substrate. The 20% is a proportion at which carbon materials start establishing a network therebetween. In this case, the carbon material further easily resists a compression load and has better abrasion resistance.

The size of the area is further preferably not less than 50% of the size of the main surface of the substrate. In this case, a state is obtained where the network between the carbon materials is completely established. Thus, the carbon material particularly easily resists a compression load and has particularly good abrasion resistance.

The size of the area is particularly preferably not less than 80% of the size of the main surface of the substrate.

When the carbon material according to the embodiment of the present disclosure is made as a film formed on a substrate, the substrate provided with the carbon material can be used, for example, as a member for a tool or for abrasion resistance.

In the carbon material, preferably, the Raman spectrum has a peak related to graphite bonds or a peak related to graphite-like bonds in the range of 1500 to 1650 $cm^{-1}$, and the ratio of the maximum peak to the maximum peak appearing in the range of 1500 to 1650 $cm^{-1}$ (a range related to graphite bonds and/or graphite-like bonds: G band) (maximum peak in D band/maximum peak in G band) is greater than 0.15. The ratio of the maximum peak (maximum peak in D band/maximum peak in G band) is more preferably not less than 0.3, further preferably not less than 0.6, and particularly preferably not less than 1.5. This is because, when the maximum peak appearing in the D band range is larger, the carbon material is harder and has higher abrasion resistance, and thus is suitable to be used for a tool.

When the maximum peak appearing in the G band range is large and the ratio of the maximum peak (maximum peak in D band/maximum peak in G band) is not greater than 0.15, the carbon material is flexible as a whole.

The peak related to "graphite bonds" is a peak having a maximum value in the range of not less than 1500 $cm^{-1}$ and less than 1650 $cm^{-1}$ and having a full width at half maximum of less than 10 $cm^{-1}$. In addition, the peak related to "graphite-like bonds" is a peak having a maximum value in the range of not less than 1500 $cm^{-1}$ and less than 1650 $cm^{-1}$ and having a full width at half maximum of not less than 10 $cm^{-1}$.

The carbon material preferably contains an alkali metal element or a halogen element. The carbon material particularly preferably contains sodium, lithium, or chlorine. When the carbon material contains an alkali metal element or a halogen element, the carbon material has reduced crack propagation, is less likely to be cracked or chipped off, and has good durability.

Regarding the lower limit of the content of the alkali metal element, the content is preferably greater than 0.008 ppm. Regarding the upper limit of the content of the alkali metal element, the content is preferably less than 100 ppm. When the content of the alkali metal element is not less than 100 ppm, strain on the crystal in the carbon material easily becomes great, defects such as point defects and holes increase, and the hardness may decrease.

Regarding the lower limit of the content of the alkali metal element, the content is more preferably greater than 0.02 ppm and further preferably greater than 0.08 ppm. On the other hand, regarding the upper limit of the content of the alkali metal element, the content is more preferably less than 20 ppm, further preferably less than 10 ppm, and particularly preferably less than 4 ppm.

Regarding the lower limit of the content of the halogen element, the content is preferably greater than 0.008 ppm.

Regarding the upper limit of the content of the halogen element, the content is preferably less than 100 ppm. When the content of the halogen element is not less than 100 ppm, strain on the crystal in the carbon material easily becomes great, defects such as point defects and holes increase, and the hardness may decrease.

Regarding the lower limit of the content of the halogen element, the content is more preferably greater than 0.02 ppm and further preferably greater than 0.08 ppm. On the other hand, regarding the upper limit of the content of the halogen element, the content is more preferably less than 20 ppm, further preferably less than 10 ppm, and particularly preferably less than 4 ppm.

Regarding the upper limit of the content of the alkali metal and the halogen element, the total content of the alkali metal and the halogen element is more preferably less than 100 ppm.

EXAMPLES

Next, the present disclosure will be described in further detail on the basis of examples, but is not limited to these examples.

Example 1

(1) Preparation of Molten Salt Electrolytic Solution A 178 g of lithium chloride and 222 g of potassium chloride were put into an alumina crucible (outer diameter 901 mm×inner diameter 84 mm×height 120 mm) and mixed therein to obtain a molten salt raw material. The concentration (mol %) of lithium chloride in the obtained molten salt raw material was 58.5 mol %. In addition, the concentration (mol %) of potassium chloride in the molten salt raw material was 41.5 mol %. Next, the molten salt raw material was dried under a vacuum condition at 180° C. for 3 days. 2 g of potassium carbonate and 8 g of potassium hydroxide were added to 400 g of the dried molten salt raw material within a glove box to obtain a mixture A. A crucible in which the obtained mixture A was put was placed within a Kanthal cylindrical container. Thereafter, while argon gas was being supplied into the cylindrical container at a flow rate of 150 mL/min, the mixture A within the crucible was heated such that the temperature of the mixture A reached 650° C., whereby the molten salt raw material in the mixture A was melted. Accordingly, a molten salt electrolytic solution A containing a LiCl—KCl eutectic composition molten salt was obtained. The concentration (mol %) of potassium carbonate in the molten salt electrolytic solution A is 0.2 mol %. In addition, the concentration (mol %) of potassium hydroxide in the molten salt electrolytic solution A is 2.0 mol %.

(2) Production of Plate Electrode

Diamond powder (trade name: MD500 manufactured by Tomei Diamond Co., Ltd., central grain diameter ($D_{50}$): 480 to 529 nm) and distilled water, the volume of which was substantially equal to that of the diamond powder, were mixed in a petri dish to obtain an abrasive grain mixture. The abrasive grain mixture was rubbed against the surface of a nickel plate (8 mm×5 mm×0.2 mm) by hand for 1 minute. Next, the surface of the plate was washed with distilled water, and then washed with ultrasonic waves. Accordingly, the diamond powder was removed from the surface of the plate, and a plate electrode was obtained.

(3) Production of Electrolytic Reduction Apparatus

Figure 2:
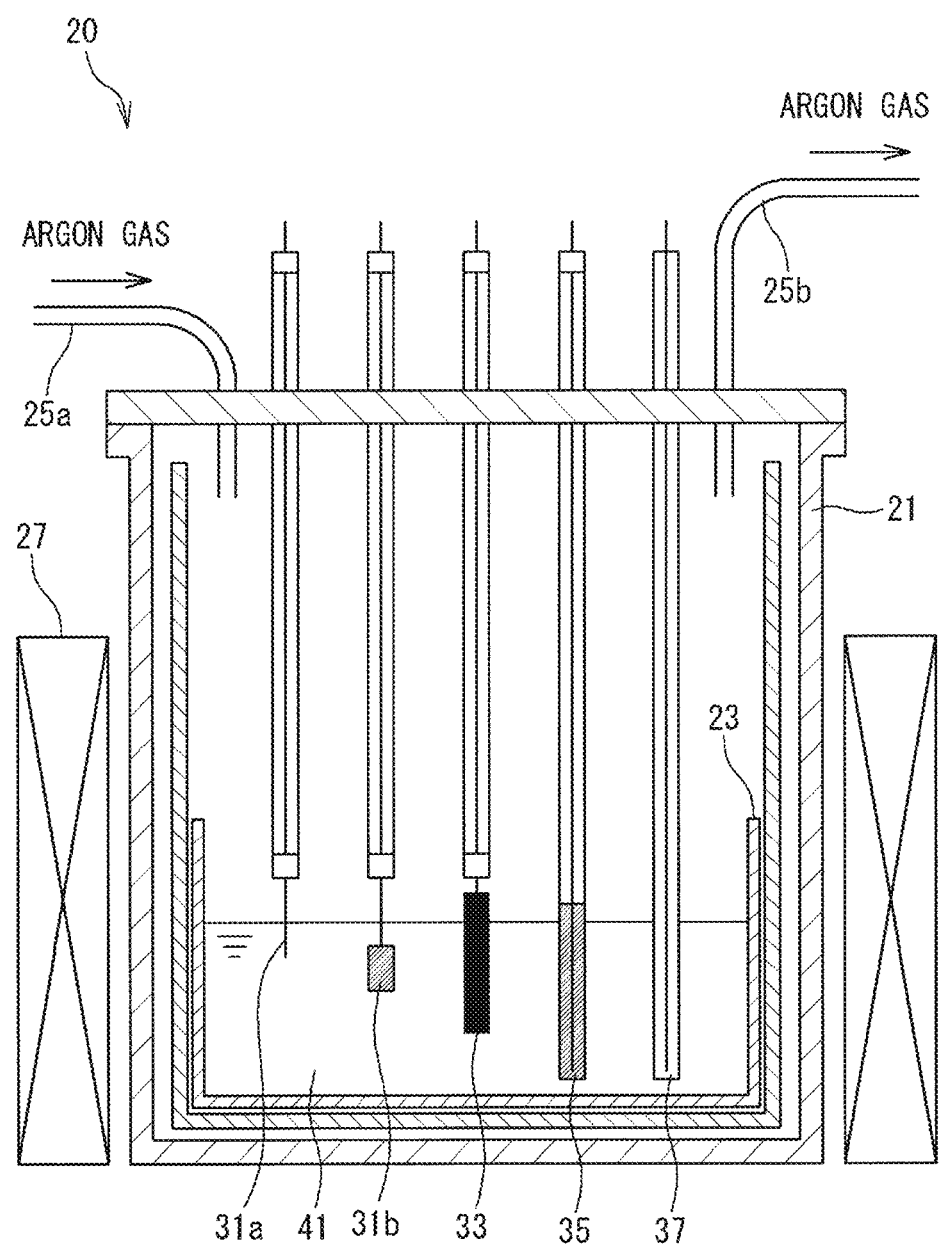
FIG. 2 is a diagram schematically illustrating an example of an electrolytic reduction apparatus used in the method for manufacturing a carbon material.

An electrolytic reduction apparatus 20 shown in FIG. 2 was produced. The electrolytic reduction apparatus 20 includes a container 21, an electrolytic bath 23, argon gas flow paths 25a and 25b, a heater 27, a working electrode 31a, a working electrode 31b serving as a cathode, a counter electrode 33 serving as an anode, a reference electrode 35, a thermocouple 37, and a molten salt electrolytic solution 41. The heater 27 is provided outside the container 21. The working electrode 31a is a nickel wire (diameter: 1.0 mm). The counter electrode 33 is a glassy carbon rod (diameter: 5 mm). In addition, the reference electrode 35 is an $Ag^+$/Ag electrode. The working electrodes 31a and 31b, the counter electrode 33, the reference electrode 35, and the thermocouple 37 are disposed within the container 21 such that ends thereof are immersed in the molten salt electrolytic solution 41 within the electrolytic bath 23. The argon gas flow paths 25a and 25b are connected to the container 21. The argon gas flow path 25a is a flow path for supplying argon gas into the container 21. The argon gas flow path 25b is a flow path for discharging argon gas out of the container 21.

In Example 1, the plate electrode obtained in (2) in Example 1 was used as the working electrode 31b. In addition, in Example 1, the molten salt electrolytic solution A obtained in (1) in Example 1 was used as the molten salt electrolytic solution 41.

Comparative Example 1

(1) Preparation of Molten Salt Electrolytic Solution B

A molten salt electrolytic solution B was obtained by performing the same operations as in (1) in Example 1, except that 2 g of potassium carbonate was added to 400 g of the dried molten salt raw material instead of adding 2 g of potassium carbonate and 8 g of potassium hydroxide to 400 g of the dried molten salt raw material. The concentration (mol %) of potassium carbonate in the molten salt electrolytic solution B is 0.2 mol %.

(2) Production of Electrolytic Reduction Apparatus

An electrolytic reduction apparatus was produced by performing the same operations as in (3) in Example 1, except that the molten salt electrolytic solution B obtained in (1) in Comparative Example 1 was used instead of using the molten salt electrolytic solution A obtained in (1) in Example 1.

Example 2

(1) Production of Plate Electrode

A plate electrode was obtained by performing the same operations as in (2) in Example 1, except that a titanium plate (8 mm×5 mm×0.2 mm) was used instead of using the nickel plate.

(2) Production of Electrolytic Reduction Apparatus

An electrolytic reduction apparatus was produced by performing the same operations as in (3) in Example 1, except that the plate electrode obtained in (1) in Example 2 was used instead of using the plate electrode obtained in (2) in Example 1.

Comparative Example 2

(1) Production of Electrolytic Reduction Apparatus

An electrolytic reduction apparatus was produced by performing the same operations as in (3) in Example 1, except that the plate electrode obtained in (1) in Example 2 was used instead of using the plate electrode obtained in (2) in Example 1, and the molten salt electrolytic solution B obtained in (1) in Comparative Example 1 was used as the molten salt electrolytic solution 41 instead of using the molten salt electrolytic solution A obtained in (1) in Example 1.

Test Example 1

In the following, the electrolytic reduction apparatuses produced in Examples 1 and 2 and Comparative Examples 1 and 2 were used. The electrolytic reduction apparatus produced in Example 1 includes the molten salt electrolytic solution A containing both carbonate ions and hydroxide ions, and a cathode formed from a nickel plate having a roughened surface. In addition, the electrolytic reduction apparatus produced in Example 2 includes the molten salt electrolytic solution A containing both carbonate ions and hydroxide ions, and a cathode formed from a titanium plate having a roughened surface. Meanwhile, the electrolytic reduction apparatus produced in Comparative Example 1 includes the molten salt electrolytic solution B containing carbonate ions and not containing hydroxide ions, and a cathode formed from a nickel plate having a roughened surface. In addition, the electrolytic reduction apparatus produced in Comparative Example 2 includes the molten salt electrolytic solution B containing carbonate ions and not containing hydroxide ions, and a cathode formed from a titanium plate having a roughened surface.

Controlled potential electrolysis was performed by applying electricity between the cathode and the anode of the electrolytic reduction apparatus at a cathode potential of 1.1 V at 650° C. until the amount of conducted electricity reached 50 C/cm². The potential is a potential represented with, as a reference, the potential ($Li^+$/Li) of metal lithium deposited on the working electrode 31a.

In this test example and Test Example 2 described later, at the same potential, the current density was substantially constant, and the amount of electricity was proportional to time.

A Raman spectrum of a deposit on each cathode was measured under the above-described conditions using a laser Raman microspectroscopy apparatus (trade name: Nanofinder 30, manufactured by Tokyo Instruments, Inc.).

Figure 3:
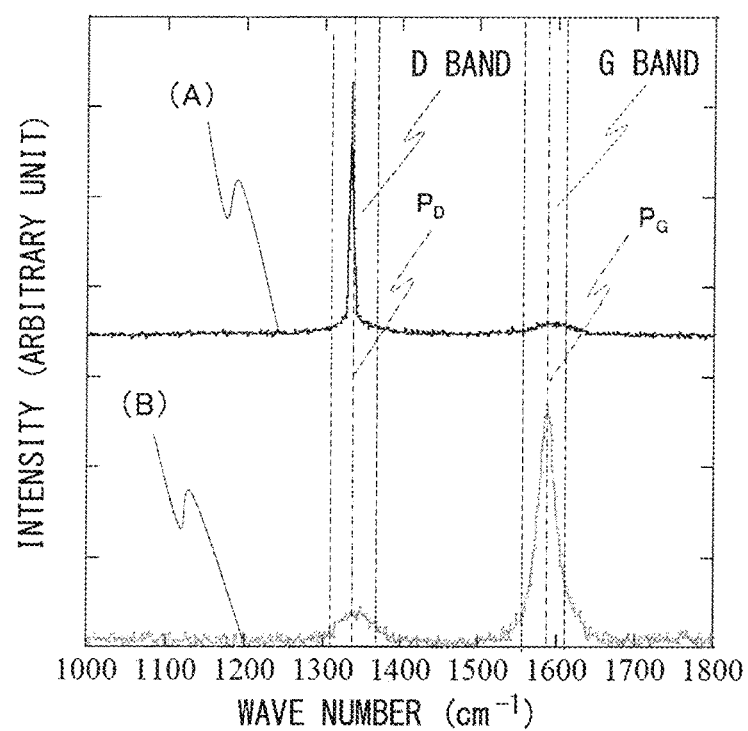
FIG. 3 is a spectrogram showing Raman spectra of deposits obtained by performing controlled potential electrolysis using electrolytic reduction apparatuses produced in Example 1 and Comparative Example 1, respectively, in Test Example 1.
Figure 4:
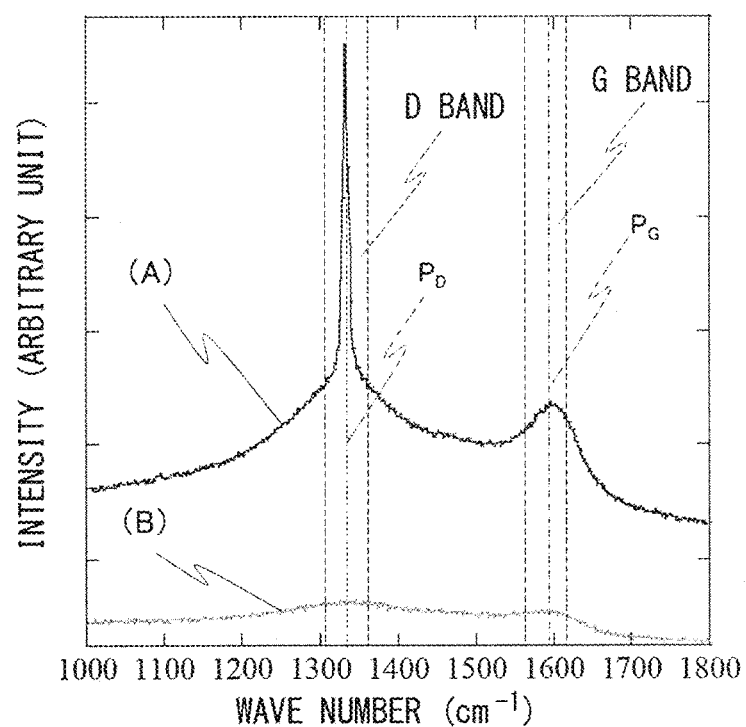
FIG. 4 is a spectrogram showing Raman spectra of deposits obtained by performing controlled potential electrolysis using electrolytic reduction apparatuses produced in Example 2 and Comparative Example 2, respectively, in Test Example 1.

The Raman spectra of the deposits obtained by performing controlled potential electrolysis using the electrolytic reduction apparatuses produced in Example 1 and Comparative Example 1 in Test Example 1 are shown in FIG. 3. In FIG. 3, (A) shows the Raman spectrum of the deposit obtained by performing controlled potential electrolysis using the electrolytic reduction apparatus produced in Example 1, and (B) shows the Raman spectrum of the deposit obtained by performing controlled potential electrolysis using the electrolytic reduction apparatus produced in Comparative Example 1. In addition, the Raman spectra of the deposits obtained by performing controlled potential electrolysis using the electrolytic reduction apparatuses produced in Example 2 and Comparative Example 2 in Test Example 1 are shown in FIG. 4. In FIG. 4, (A) shows the Raman spectrum of the deposit obtained by performing controlled potential electrolysis using the electrolytic reduction apparatus produced in Example 2, and (B) shows the Raman spectrum of the deposit obtained by performing controlled potential electrolysis using the electrolytic reduction apparatus produced in Comparative Example 2. In FIG. 3 and FIG. 4, $P_D$ indicates a peak, in the D band of 1250 to 1400 $cm^{-1}$, arising from an $sp^3$ hybrid orbital, and $P_G$ indicates a peak, in the G band of 1500 to 1650 $cm^{-1}$, arising from an $sp^2$ hybrid orbital.

A peak in the range of not less than 1325 cm$^{-1}$ and less than 1335 cm$^{-1}$ arises from an sp$^3$ hybrid orbital. In addition, when the peak in the range of not less than 1325 cm$^{-1}$ and less than 1335 cm$^{-1}$ arises from an sp$^3$ hybrid orbital of diamond having long range order, the peak is a sharp peak having a full width at half maximum of 2 to 10 cm$^{-1}$. Meanwhile, a peak at approximately 1580 cm$^{-1}$ arises from an sp$^2$ hybrid orbital. In addition, a peak at approximately 1360 cm$^{-1}$ arises from an spa hybrid orbital of a diamond-like structure having short range order. Therefore, when a sharp peak having a full width at half maximum of 2 to 10 cm$^{-1}$ is observed in the range of not less than 1325 cm$^{-1}$ and less than 1335 cm$^{-1}$ (see $P_D$ in the drawing), this peak indicates that the deposit is diamond. Meanwhile, when a broad peak having a full width at half maximum exceeding 10 cm$^{-1}$ is observed in the range of 1270 cm$^{-1}$ to 1380 cm$^{-1}$ (see $P_D$ in the drawing), this peak indicates that the deposit is a diamond-like carbon material in which a distance for maintaining the order thereof is changed in accordance with the full width at half maximum. When the distance for the order is longer, that is, when the full width at half maximum is smaller, the carbon material becomes harder and is useful as a tool material. When a peak at approximately 1580 cm$^{-1}$ (see $P_G$ in the drawing) or a broad peak is observed, this peak indicates that the deposit contains matter that is not diamond.

From the results shown in FIG. 3, it is found that, when the electrolytic reduction apparatus produced in Example 1 was used, a sharp peak having a full width at half maximum of 4 cm$^{-1}$ is observed in the range of not less than 1325 cm$^{-1}$ and less than 1335 cm$^{-1}$, and almost no peak is observed at approximately 1580 cm$^{-1}$, in the Raman spectrum of the obtained deposit. Therefore, it is found that the deposit on the cathode of the electrolytic reduction apparatus produced in Example 1 is diamond. On the other hand, it is found that, when the electrolytic reduction apparatus produced in Comparative Example 1 was used, a broad peak having a full width at half maximum of 60 cm$^{-1}$ is observed in the range of not less than 1325 cm$^{-1}$ and less than 1335 cm$^{-1}$, and a peak having a full width at half maximum of 20 cm$^{-1}$ is observed at approximately 1580 cm$^{-1}$, in the Raman spectrum of the obtained deposit. Here, the intensity ratio (the former/the latter) is about 0.1. Therefore, the deposit on the cathode of the electrolytic reduction apparatus produced in Comparative Example 1 does not have diamond bonds having a small full width at half maximum (<5 cm$^{-1}$), and the Raman sensitivity of a carbon material having diamond bonds or diamond-like bonds having a large full width at half maximum (≥5 cm$^{-1}$) is equal to or less than half that of a material having sp$^2$ bonds, and thus it is found that these carbon materials are less than 5%. From these results, it is found that, by performing electrolysis using, as a medium, the molten salt electrolytic solution A containing both carbonate ions and hydroxide ions, diamond is deposited on the cathode formed from the nickel plate.

From the results shown in FIG. 4, it is found that, when the electrolytic reduction apparatus produced in Example 2 was used, a sharp peak having a full width at half maximum of 4 cm$^{-1}$ is observed in the range of not less than 1325 cm$^{-1}$ and less than 1335 cm$^{-1}$ (see $P_D$ in the drawing), and a weak peak is merely observed at approximately 1580 cm$^{-1}$ (see PG in the drawing), in the Raman spectrum of the obtained deposit. Therefore, it is found that the deposit on the cathode of the electrolytic reduction apparatus produced in Example 2 is a mixture that contains, as a main component, a carbon material having diamond bonds having a small full width at half maximum (<5 cm$^{-1}$) and contains a slight amount of a carbon material including graphite bonds or graphite-like bonds. On the other hand, it is found that, when the electrolytic reduction apparatus produced in Comparative Example 2 was used, a broad weak peak having a full width at half maximum of 120 cm$^{-1}$ is observed in the range of not less than 1325 cm$^{-1}$ and less than 1335 cm$^{-1}$, and a broad weak peak having a full width at half maximum of 80 cm$^{-1}$ is observed at approximately 1580 cm$^{-1}$, in the Raman spectrum of the obtained deposit. Therefore, the deposit on the cathode of the electrolytic reduction apparatus produced in Comparative Example 2 is not a carbon material having diamond bonds having a small full width at half maximum (<5 cm$^{-1}$) but a carbon material close to DLC having diamond bonds or diamond-like bonds having a large full width at half maximum (≥5 cm$^{-1}$).

From these results, it is found that, by performing electrolysis using, as a medium, the molten salt electrolytic solution A containing both carbonate ions and hydroxide ions, diamond is deposited on the cathode formed from the titanium plate.

In the Raman spectrum of the embodiment of the present invention, a small full width at half maximum indicates high order of crystallinity, and a large full width at half maximum indicates low order of crystallinity.

Test Example 2

Other samples were produced by using the method in Test Example 1 and further conducting an experiment for obtaining a deposit using either one of the electrolytic reduction apparatuses of Examples 1 and 2, and evaluation was performed using the obtained samples.

Samples 1 to 8

Samples 1 to 8 were obtained by the above-described method. For the obtained samples 1 to 8, a Raman spectrum was measured. Furthermore, the samples 1 to 8 were observed for "whether a part of a crystal that is a hexa-octahedron is contained", measured for "Vickers hardness", and evaluated for "presence/absence of cracking or chipping". These results are shown in Table 1.

The samples 1 to 4 are deposits obtained using the electrolytic reduction apparatus of Example 1, and the samples 5 to 8 are deposits obtained using the electrolytic reduction apparatus of Example 2.

Furthermore, Table 1 also shows the results of a Raman spectrum of a reference sample Z produced by the following method.

Reference sample Z: diamond having a thickness of 10 μm produced on a silicon substrate using a vertical quartz tube type microwave CVD apparatus (using a quartz tube having a diameter of 46 mm) under conditions of a pressure of 40 Torr; a substrate temperature of 850° C.; a power of 300 W; and a mole ratio of methane gas to hydrogen gas being 6%.

TABLE 1

| | D: 1250 to 1400 (cm⁻¹) | | | | G: 1500 to 1650 (cm⁻¹) | | | | | | | |
|---|---|---|---|---|---|---|---|---|---|---|---|---|
| | Position of maximum peak (cm$^{-1}$) | Full width at half maximum of maximum peak (cm$^{-1}$) | Position of second largest peak (cm$^{-1}$) | Full width at half maximum of second largest peak (cm$^{-1}$) | Position of maximum peak (cm$^{-1}$) | Full width at half maximum of maximum peak (cm$_{-1}$) | Position of second largest peak (cm$^{-1}$) | Full width at half maximum of second largest peak (cm$^{-1}$) | D/G | Presence/absence of part of crystal that is hexa-octahedron | Vickers hardness (GPa) | Presence/absence of cracking or chipping |
| Sample 1 | 1333 | 19 | — | — | 1580 | 22 | 1620 | 11 | 2 | Not contained | 90 | None |
| Sample 2 | 1350 | 29 | — | — | 1580 | 25 | 1620 | 15 | 1 | Not contained | 85 | None |
| Sample 3 | 1333 | 11 | — | — | 1580 | 30 | 1620 | 25 | 4 | Not contained | 90 | None |
| Sample 4 | 1331 | 4.6 | — | — | 1579 | 81 | — | — | 3.7 | Not contained | 90 | None |
| Sample 5 | 1331 | 4.3 | 1350 | 47 | 1580 | 28 | — | — | 2.3 | Not contained | 95 | None |
| Sample 6 | 1331 | 3.9 | 1349 | 88 | 1557 | 430 | — | — | 1.5 | Not contained | 90 | None |
| Sample 7 | 1352 | 35 | 1330 | 9 | 1580 | 28 | — | — | 0.7 | Not contained | 80 | None |
| Sample 8 | 1331 | 5.1 | 1349 | 41 | 1581 | 86 | — | — | 6.9 | Not contained | 90 | None |
| Reference sample Z | 1355 | 110 | 1331 | 7 | 1570 | 90 | — | — | 2.8 | Contained | 60 | None |

In Table 1, the "position of maximum peak" at the 1250 to 1400 (cm$^{-1}$) field is the Raman shift value of the peak indicating the maximum Raman intensity among peaks appearing in the range of 1250 to 1400 (cm$^{-1}$). The "full width at half maximum of maximum peak" at the same field is the full width at half maximum of the peak indicating the maximum intensity. The "position of second largest peak" at the same field is the Raman shift value of the peak indicating the highest Raman intensity next to that of the maximum peak among the peaks appearing in the range of 1250 to 1400 (cm$^{-1}$), and the "full width at half maximum of second largest peak" at the same field is the full width at half maximum of the second largest peak indicating the highest Raman intensity next to that of the maximum peak.

The "position of maximum peak" at the 1500 to 1650 (cm$^{-1}$) field is the Raman shift value of the peak indicating the maximum Raman intensity among peaks appearing in the range of 1500 to 1650 (cm$^{-1}$). The "full width at half maximum of maximum peak" at the same field is the full width at half maximum of the peak indicating the maximum intensity. In addition, the "position of second largest peak" at the 1500 to 1650 (cm$^{-1}$) field is the Raman shift value of the peak indicating the highest Raman intensity next to that of the maximum peak among the peaks appearing in the range of 1500 to 1650 (cm$^{-1}$), and the "full width at half maximum of second largest peak" at the same field is the full width at half maximum of the second largest peak indicating the highest Raman intensity next to that of the maximum peak.

In Table 1, "D/G" indicates the ratio of the Raman intensity of the peak indicating the maximum Raman intensity, among the peaks appearing in the range of 1250 to 1400 (cm$^{-1}$), relative to the intensity of the peak indicating the maximum Raman intensity, among the peaks appearing in the range of 1500 to 1650 (cm$^{-1}$).

For the samples 1 to 8 and the reference sample Z, presence/absence of a part of a crystal that is a hexa-octahedron was observed using a SEM. Presence/absence of a part of a crystal that is a hexa-octahedron was determined on the basis of whether a triangular, quadrangular, or hexagonal flat surface can be observed through SEM observation. Specifically, such determination was performed by the following method.

Observations were made using a SEM at a magnification at which at least a 10 μm square comes into sight (for example, 1000 to 10000 times). Basically, a carbon material surface having an uneven surface is confirmed by a fact that the contrast of a surface image greatly changes within a distance of 1 μm (the average of brightness is less than 50% or not less than 150%) and is not uniform within the surface. On the other hand, if the surface of a carbon material has a flat surface, the contrast of a surface image is uniform over a distance of 1 μm or greater (the average of brightness falls within the range of not less than 50% and less than 150%), and at least two ridge lines (straight lines) are confirmed at the edge of the flat surface. At this time, when the angle at which two ridge lines on a certain flat surface intersect each other is in the range of 60±5°, 90±5°, or 120±5°, the flat surface is determined to be a part of a triangular flat surface, a quadrangular flat surface, or a hexagonal flat surface. When the flat surface is observed, a part of a crystal that is a hexa-octahedron is determined to be contained.

The "Vickers hardness" was measured by a general evaluation method using a normal indenter formed from single crystal diamond. A measurement value of the Vickers hardness is the average of measurement values at different positions (five locations) in an area, where the peak in the range of 1250 cm$^{-1}$ to 1400 cm$^{-1}$ is present, at substantially the center of each sample.

"Presence/absence of cracking or chipping" was evaluated by performing a standard working test using test cutting tools produced by using the deposits obtained as the samples 1 to 8.

As each cutting tool, a cutting bit having a substantially triangular top face (cutting face), an edge open angle of 60±10°, and an angle of the cutting face and a flank of not less than 70° and not greater than 80° was produced using a plate material that was cut out of the deposit with a desired size and a desired shape. Here, the deposit was brought into a state of having no chipping of 5 μm or greater. Regarding the cutting conditions in the working test, aluminum material A5052 was used as a material to be cut, a cutting speed was 500 m/min, a cutting amount was 0.1 mm, and a feed speed was 0.01 mm/rev. The working test was conducted under these conditions for 5 hours. After the working test, presence/absence of chipping was evaluated on the basis of whether chipping of 5 μm or greater is present.

Presence/absence of cracking was evaluated on the basis of whether cracking (a crack equal to or greater than ⅓ of the length of the deposit) occurs in the cutting bit during any of the cutting bit production and the working test.

As shown in Table 1, each of the samples 1 to 8 did not contain a part of a crystal that is a hexa-octahedron.

The Vickers hardnesses of the measured samples 1 to 8 were not less than 80 GPa. On the other hand, the Vickers hardness of the reference sample Z was 60 GPa and lower than those of the samples 1 to 8.

The samples 1 to 8 and the reference sample Z were not cracked or chipped off during the above-described working test. The cutting conditions in the above-described working test are cutting conditions under which cracking or chipping may occur in diamond produced using a conventional chemical vapor deposition method, and the carbon materials of the samples 1 to 8 are indicated to be suitable as a raw material for cutting tools and the like. The reason for this is inferred to be that the carbon materials of the samples 1 to 8 are each a carbon material having a peak in the range of 1335 cm$^{-1}$ to 1370 cm$^{-1}$ or a carbon material having a peak in the range of not less than 1325 cm$^{-1}$ and less than 1335 cm$^{-1}$ and having a peak having a full width at half maximum greater than the full width at half maximum of conventional diamond.

(Samples 11 to 13)

Samples 11 to 13 were obtained by the above-described method. For the obtained samples 11 to 13, measurement of "Vickers hardness" and evaluation of "presence/absence of cracking or chipping" were performed by the same methods as the above-described methods. The results of these are shown in Table 2. The samples 11 to 13 are deposits obtained using the electrolytic reduction apparatus of Example 1.

TABLE 2

| | D: 1250 to 1400 (cm$^{-1}$) | | | | G: 1500 to 1650 (cm$^{-1}$) | | | | | | |
|---|---|---|---|---|---|---|---|---|---|---|---|
| | Position of maximum peak (cm$^{-1}$) | Full width at half maximum of maximum peak (cm$^{-1}$) | Position of second largest peak (cm$^{-1}$) | Full width at half maximum of second largest peak (cm$^{-1}$) | Position of maximum peak (cm$^{-1}$) | Full width at half maximum of maximum peak (cm$^{-1}$) | Position of second largest peak (cm$^{-1}$) | Full width at half maximum of second largest peak (cm$^{-1}$) | D/G | Vickers hardness (GPa) | Presence/ absence of cracking or chipping |
| Sample11 | 1331 | 4.5 | 1350 | 40 | 1580 | 25 | — | — | 0.3 | 80 | None |
| Sample12 | 1352 | 98 | — | — | 1558 | 400 | — | — | 0.16 | 75 | None |
| Sample13 | 1331 | 4 | — | — | 1580 | 30 | — | — | 0.12 | 50 | None |

In the samples 11 to 13, the values of "D/G" were lower than those of the samples 1 to 8, but Vickers hardnesses of 50 GPa or greater were ensured, and cracking or chipping did not occur even during the above-described working test.

The reason why the values of "D/G" are low in the samples 11 to 13 is considered to be that, for example, pretreatment (roughening) on the substrate for assisting in growth of a carbon material was insufficient, or an experiment was conducted with controlled potential electrolysis but the actually applied voltage during electrolysis was low.

The results of the samples 11 to 13 demonstrate that the Vickers hardness can be increased by making "D/G" greater than 0.15, and can be particularly increased by making "D/G" equal to or greater than 0.3.

(Samples 21 and 22)

Samples 21 and 22 were obtained by the above-described method. For the obtained samples 21 and 22, the concentrations of lithium, potassium, and chlorine were measured. The concentration of each of the components was measured by using secondary ion mass spectrometry. In addition, for the samples 21 and 22, measurement of "Vickers hardness" and evaluation of "presence/absence of cracking or chipping" were performed by the same methods as the above-described methods. The results of these are shown in Table 3. The samples 21 and 22 are deposits obtained using the electrolytic reduction apparatus of Example 1.

Furthermore, the concentrations of lithium, potassium, and chlorine in the reference sample Z were measured by the above-described method, and the results thereof are also shown in Table 3.

TABLE 3

| | D: 1250 to 1400 ($cm^{-1}$) | | | | G: 1500 to 1650 ($cm^{-1}$) | | |
|---|---|---|---|---|---|---|---|
| | Position of maximum peak ($cm^{-1}$) | Full width at half maximum of maximum peak ($cm^{-1}$) | Position of second largest peak ($cm^{-1}$) | Full width at half maximum of second largest peak ($cm^{-1}$) | Position of maximum peak ($cm^{-1}$) | Full width at half maximum of maximum peak ($cm^{-1}$) | Position of second largest peak ($cm^{-1}$) |
| Sample 21 | 1348 | 28 | — | — | 1580 | 24 | — |
| Sample 22 | 1331 | 3.7 | — | — | — | — | — |
| Reference sample Z | 1355 | 110 | 1331 | 7 | 1570 | 90 | — |

| | G: 1500 to 1650 ($cm^{-1}$) Full width at half maximum of second largest peak ($cm^{-1}$) | D/G | Alkali metal | | Halogen element | Vickers hardness (GPa) | Presence/absence of cracking or chipping |
|---|---|---|---|---|---|---|---|
| | | | Lithium (ppm) | Potassium (ppm) | Chlorine (ppm) | | |
| Sample 21 | — | 1.2 | 0.8 | 0.4 | 2 | 80 | None |
| Sample 22 | — | — | 0.5 | 0.2 | 0.9 | 100 | None |
| Reference sample Z | — | 2.8 | <0.1 | <0.1 | <0.1 | 60 | None |

The results of the samples 21 and 22 demonstrate that the carbon material according to the embodiment of the present disclosure containing an alkali metal element or a halogen element is suitable as raw materials for cutting tools and the like, since cracking or chipping does not occur in the carbon material even when the carbon material has high hardness.

(Samples 31 to 34)

Samples 31 to 34 were obtained by the above-described method. For the obtained samples 31 to 34, a size proportion (%) of an area in which a carbon material having a peak related to diamond bonds or a peak related to diamond-like bonds was deposited, relative to the entire surface of the substrate, was calculated. Mapping data of a Raman spectrum was obtained, and the size proportion (%) was calculated on the basis of the obtained mapping data. The samples 31 to 34 are deposits obtained using the electrolytic reduction apparatus of Example 1.

A reference sample W in which a size ratio of an area in which a film was formed from a carbon material is 5% was separately produced.

The method for producing the reference sample W is as follows.

A super hard material (WC—Co) having a binder occupying 5% as an area ratio was produced on a substrate, then Co was thinly removed (about 5 μm), and diamond was formed on the surface of the super hard material. At this time, for forming the diamond, the same conditions as those for producing the reference sample Z were adopted except that the substrate temperature was set to 880° C. Thereafter, the diamond on WC was removed by polishing such that the diamond was left only on Co, to produce the reference sample W.

For the samples 31 to 34 and the reference sample W, measurement of "Vickers hardness" was performed by the same method as the above-described method, and "abrasion resistance" was evaluated by a method described later. The results are shown in Table 4.

The above evaluation of abrasion resistance was performed by calculating an amount of abrasion caused when each sample was rubbed against an $Al_2O_3$ material under the same load, on the basis of a reduction in thickness. Specifically, the evaluation was performed by the following method.

First, each sample was processed into an evaluation sample having a diameter of 300 μm.

Next, the evaluation sample processed with a diameter of 300 μm was pressed against a flat alumina substrate under a load of 0.8 MPa and slid in a circular manner at a speed of 5 m/min. After 1 hour, an amount of abrasion was measured.

The same evaluation was performed using a standard sample in which a diamond film is provided on the entire surface using a raw material of which 100% is polycrystal diamond, and an amount of abrasion of the standard sample was measured. The abrasion resistance of the samples 31 to 34 and the reference sample W was calculated with the abrasion resistance of the standard sample being set at 100%.

TABLE 4

| | D: 1250 to 1400 (cm⁻¹) | | | | G: 1500 to 1650 (cm⁻¹) | | | | | | | |
|---|---|---|---|---|---|---|---|---|---|---|---|---|
| | Position of maximum peak ($cm^{-1}$) | Full width at half maximum of maximum peak ($cm^{-1}$) | Position of second largest peak ($cm^{-1}$) | Full width at half maximum of second largest peak ($cm^{-1}$) | Position of maximum peak ($cm^{-1}$) | Full width at half maximum of maximum peak ($cm^{-1}$) | Position of second largest peak ($cm^{-1}$) | Full width at half maximum of second largest peak ($cm^{-1}$) | D/G | Area (%) | Vickers hardness (GPa) | Abrasion resistance (diamond 100% ratio) (%) |
| Sample 31 | 1333 | 10 | — | — | 1582 | 29 | 1620 | 22 | 1.5 | 10 | 95 | 70 |
| Sample 32 | 1350 | 55 | — | — | 1580 | 22 | — | — | 2 | 20 | 80 | 82 |
| Sample 33 | 1331 | 4.3 | 1350 | 40 | 1580 | 35 | — | — | 0.8 | 50 | 90 | 86 |
| Sample 34 | 1350 | 28 | 1331 | 6 | 1580 | 30 | — | — | 2.5 | 80 | 85 | 90 |
| Reference sample W | 1355 | 150 | 1331 | 7 | 1575 | 100 | 1620 | 50 | 0.2 | 5 | 60 | 30 |

The results of the samples 31 to 34 and the reference sample W demonstrate that the abrasion resistance improves when the proportion of the area occupied by the carbon material having a peak related to diamond bonds or a peak related to diamond-like bonds increases.

From the above results, it is found that, in a state where an anode and a cathode having a roughened surface are disposed in a molten salt electrolytic solution containing carbonate ions and hydroxide ions in a molten salt, electrolytic reduction of the carbonate ions and the hydroxide ions is performed, whereby the carbon material according to the embodiment of the present disclosure can be generated on the cathode.

In addition, it is also confirmed that the carbon material according to the embodiment of the present disclosure has high hardness and cracking or chipping is less likely to occur therein.

Example 3

(1) Production of electrolytic reduction apparatus

An electrolytic reduction apparatus was obtained by performing the same operations as in (3) in Example 1, except that a nickel plate (a plate, the surface of which had not been roughened) was used instead of using, in (2) in Example 1, the plate electrode obtained in (3) in Example 1.

(2) Controlled Potential Electrolysis Operation

Under a condition that reaction between $sp^2$ carbon atoms and adsorbed hydrogen atoms is promoted (a condition that the temperature during electrolysis is not lower than 650° C., or a condition that the current density in reduction of the hydroxide ions is higher than the current density in reduction of the carbonate ions), controlled potential electrolysis was performed by applying electricity between the cathode and the anode at a cathode potential of 1.1 V until the amount of conducted electricity reached 50 C/cm². As the potential, a potential calibrated with the potential (Li⁺/Li) of metal lithium deposited on the working electrode 31a was used.

A Raman spectrum of a deposit on the cathode was measured under the above-described conditions using a laser Raman microspectroscopy apparatus (trade name: Nanofinder 30, manufactured by Tokyo Instruments, Inc.). The results show that in the Raman spectrum of the deposit, a sharp peak is observed in the range of not less than 1325 cm⁻¹ and less than 1335 cm⁻¹, and a broad peak is observed or no peak is observed at approximately 1580 cm⁻¹. Therefore, the results demonstrate that the deposit is diamond.

From the above results, it is found that, in a state where an anode and a cathode are disposed in a molten salt electrolytic solution containing carbonate ions and hydroxide ions in a molten salt, electrolytic reduction of the carbonate ions and the hydroxide ions is performed under a condition that reaction between $sp^2$ carbon atoms and adsorbed hydrogen atoms is promoted (a condition that the temperature of the molten salt electrolytic solution in performing electrolytic reduction is a temperature exceeding 650° C., or a condition that the current density in reduction of the hydroxide ions is higher than the current density in reduction of the carbonate ions), whereby the carbon material according to the embodiment of the present disclosure can be generated on the cathode.

REFERENCE SIGNS LIST

1 electrolytic reduction apparatus
11 electrolytic bath
12 molten salt electrolytic solution
13 anode
14 cathode
15 power supply
20 electrolytic reduction apparatus
21 container
23 electrolytic bath
25a, 25b argon gas flow path
27 heater
31a working electrode
31b working electrode (cathode)
33 counter electrode (anode)
35 reference electrode
37 thermocouple
41 molten salt electrolytic solution

The invention claimed is:

1. A method for manufacturing a carbon material, the method comprising the step of, in a state where a cathode having a roughened surface and an anode are disposed in a molten salt electrolytic solution containing carbonate ions and hydroxide ions in a molten salt, performing electrolytic reduction of the carbonate ions and the hydroxide ions contained in the molten salt electrolytic solution, to generate a carbon material on the cathode, wherein the cathode having the roughened surface is a cathode having a surface roughened by diamond abrasive grains having a grain diameter of 20 nm to 5 μm or silicon carbide abrasive grains having a grain diameter of 20 nm to 5 μm, wherein the carbon material has at least either a peak related to diamond bonds, or a peak related to diamond-like bonds, appearing in a range of 1250 to 1400 cm⁻¹ in a spectrum measured by Raman scattering spectrometry, and wherein a full width at half maximum of a maximum peak, or each of full widths at half maximum of the maximum peak and a second largest peak, among peaks appearing in the range of 1250 to 1400 $cm^{-1}$, has a signal less than 100 $cm^{-1}$.

2. The method according to claim 1, wherein the cathode having the roughened surface is the cathode having the surface roughened by diamond abrasive grains.

3. The method according to claim 1, wherein the molten salt is a molten salt containing at least one type of cation selected from the group consisting of alkali metal ions and alkaline earth metal ions, as a cation, and a halide anion as an anion.

\* \* \* \* \*